(12) United States Patent
Chiou et al.

(10) Patent No.: US 8,312,290 B2
(45) Date of Patent: Nov. 13, 2012

(54) BIOMETRIC METHOD AND APPARATUS AND BIOMETRIC DATA ENCRYPTION METHOD THEREOF

(75) Inventors: Shin-Yan Chiou, Hsinchu County (TW); Yen-Hsueh Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 1205 days.

(21) Appl. No.: 12/018,149

(22) Filed: Jan. 22, 2008

(65) Prior Publication Data

US 2009/0138724 A1 May 28, 2009

(30) Foreign Application Priority Data

Nov. 26, 2007 (TW) .............................. 96144798 A

(51) Int. Cl.
*G06F 21/00* (2006.01)
*G06F 7/04* (2006.01)
*G06F 15/16* (2006.01)
*G06F 17/30* (2006.01)
*H04L 29/06* (2006.01)

(52) U.S. Cl. .......... 713/186; 713/182; 713/168; 380/44; 382/115

(58) Field of Classification Search .................. 713/182, 713/186, 168; 380/44, 229; 382/115, 116, 382/209; 726/9, 26
See application file for complete search history.

(56) References Cited

U.S. PATENT DOCUMENTS

| 5,229,764 | A  | * | 7/1993  | Matchett et al. | ............. 340/5.52 |
| 6,901,154 | B2 | * | 5/2005  | Dunn | ............................ 382/115 |
| 7,079,007 | B2 | * | 7/2006  | Siegel et al. | ................. 340/5.52 |
| 7,188,362 | B2 |   | 3/2007  | Brandys |  |
| 7,693,279 | B2 | * | 4/2010  | Chen et al. | ....................... 380/44 |
| 2003/0115473 | A1 | * | 6/2003 | Sugimura et al. | ............. 713/186 |
| 2004/0219902 | A1 | * | 11/2004 | Lee et al. | ....................... 455/410 |
| 2005/0154924 | A1 | * | 7/2005  | Scheidt et al. | ................ 713/202 |
| 2005/0210269 | A1 | * | 9/2005  | Tiberg | ........................... 713/186 |
| 2007/0192601 | A1 | * | 8/2007  | Spain et al. | .................... 713/168 |
| 2008/0209226 | A1 | * | 8/2008  | Venkatesan et al. | .......... 713/186 |

FOREIGN PATENT DOCUMENTS

CN            1373885           10/2002
(Continued)

OTHER PUBLICATIONS

Article titled "Combining cryptography with biometrics effectively" authored by Hao et al., Technical Report (Computer Laboratory) published by the University of Cambridge, No. 640, Jul. 2005 (pp. 1-17).

(Continued)

*Primary Examiner* — Edan Orgad
*Assistant Examiner* — Kari Schmidt
(74) *Attorney, Agent, or Firm* — Jianq Chyun IP Office

(57) ABSTRACT

A biometric method, a biometric apparatus, and a biometric data encryption method thereof are disclosed. In the biometric method and the biometric apparatus, a biometric data is quantified to obtain a quantified data. A one-way function is then performed to convert the quantified data into an encrypted data. In the present invention, the biometric data is protected through a cryptography system so as to prevent the biometric features from being stolen or misappropriated. Moreover, in the present invention, a biometric technique can be integrated with a cryptography technique.

5 Claims, 3 Drawing Sheets

FOREIGN PATENT DOCUMENTS

| | | |
|---|---|---|
| TW | 502223 | 9/2002 |
| TW | 525096 | 3/2003 |
| TW | I220502 | 8/2004 |
| TW | I220741 | 9/2004 |
| TW | I223205 | 11/2004 |
| TW | I249314 | 2/2006 |
| TW | 200612706 | 4/2006 |

OTHER PUBLICATIONS

"First Office Action of China Counterpart Application", issued on Nov. 5, 2010, p. 1-p. 6.

Yevgeniy Dodis, et al., "Fuzzy Extractors: How to Generate Strong Keys from Biometrics and Other Noisy Data", Eurocrypt, 2004, p. 523-540.

\* cited by examiner

BIOMETRIC METHOD AND APPARATUS AND BIOMETRIC DATA ENCRYPTION METHOD THEREOF

CROSS-REFERENCE TO RELATED APPLICATION

This application claims the priority benefit of Taiwan application serial no. 96144798, filed on Nov. 26, 2007. The entirety of the above-mentioned patent application is hereby incorporated by reference herein and made a part of this specification.

BACKGROUND OF THE INVENTION

1. Field of the Invention

The present invention generally relates to a biometric technique, and more particularly, to a biometric method and a biometric apparatus integrated with a cryptography technique.

2. Description of Related Art

Thanks to the development of information technology, many routines and procedures in our daily life have been gradually digitalized. People record their daily experiences and creative ideas into personal computers, digital media, and mobile devices and use various encryption and authentication methods for protecting such important data. Conventional encryption and authentication methods, such as personal password, cannot provide sufficient security in data protection. Not only a user has to memorize different passwords and which may result in mistakes, but the passwords may be misappropriated or cracked. Individually specific "biological identities" (for example, human faces, fingerprints, signatures, and irises) can be adopted for providing effective data protection since they cannot be duplicated or stolen.

FIG. 1 is a flowchart of a conventional biometric method. A particular biometric feature is usually registered or recorded in advance (step S110) to be used in subsequent comparison. After that, a biometric apparatus requests a user to input a biometric data (step S120) and compares the biometric data with the registered biometric feature (step S130) to determine whether the two match with each other (step S140). If the registered biometric feature matches with the biometric data input by the user, the biometric apparatus outputs a result indicating that the authentication is successful (step S150); otherwise, if the registered biometric feature does not match with the biometric data input by the user, the biometric apparatus outputs a result indicating that the authentication failed (step S160). Generally speaking, the implementations of foregoing step S110 and step S120 are similar. For example, step S120 can be divided into various sub-steps, such as data collection (step S121), signal processing (step S122), biometric feature extraction (step S123), and biometric data input (step S124).

Regarding the comparison between the registered biometric feature and the biometric data in foregoing step S130, a threshold is usually used in biometric authentication. Values within the threshold are accepted, while values over the threshold are rejected. Unlike cryptography techniques, such authentication comparison does not require 100% accuracy, namely, a certain error between the compared two data is tolerable. For example, assuming that a registered biometric feature is 35 and the threshold is 5, then the registered biometric feature and a biometric data are considered to match with each other if the biometric data is between 30 and 40, and the registered biometric feature and a biometric data are considered not to match with each other if the biometric data is smaller than 30 or greater than 40. As to a cryptography technique, assuming that a registered password is 35, the registered password and an input password are considered not to match with each other if the input password is 37, and the registered password and an input password are considered to match with each other if the input password is 35. Biometrics and cryptography are compared side-by-side in following table 1.

TABLE 1

Comparison between biometrics and cryptography

|  | Cryptography | Biometrics |
| --- | --- | --- |
| Authentication method | Digital | Analog |
| Authentication rule | Without error tolerance | With error tolerance |
| Data processing | Data is disordered | Data is processed but not disordered |
| Adoption of cryptography technique | Data can be encrypted and signed | Data cannot be encrypted or signed |

However, a conventional biometric method can only compare data locally and cannot be integrated with any cryptography technique. This is because the biometric data which allows a certain error will be completely disordered and accordingly cannot be compared anymore once it is encrypted. Besides, when a biometric data is pre-recorded into a biometric apparatus as a registered biometric feature and is compared with a biometric data, following problems may be incurred.

(1) The registered biometric feature stored in the biometric apparatus may be cracked and stolen.

(2) Since a certain error is acceptable between the registered biometric feature and a biometric data, the biometric data cannot be protected through any data security method such as a hash function or an encryption operation. Thereby, the biometric data may be intercepted when the comparison is carried out remotely.

SUMMARY OF THE INVENTION

The present invention provides a biometric data encryption method. First, a biometric data is provided. A plurality of value ranges is then defined according to a threshold, wherein each of the value ranges has a quantization value. If the biometric data falls within one of the value ranges, the quantization value of the value range is used as a quantified data for replacing the biometric data. After that, a one-way function is performed to convert the quantified data into an encrypted data.

The present invention provides a biometric method. First, an encrypted registered data is provided, and a biometric data is extracted. A plurality of value ranges is then defined according to a threshold, wherein each of the value ranges has a quantization value. If the biometric data falls within one of the value ranges, the quantization value of the value range is used as a quantified data for replacing the biometric data. After that, a one-way function is performed to convert the quantified data into an encrypted data. The encrypted data is then compared with the encrypted registered data.

The present invention provides a biometric apparatus including an extraction unit, a database, and a processing unit. The extraction unit extracts a biometric data. The database records at least one encrypted registered data. The processing unit is coupled to the extraction unit and the database. The processing unit defines a plurality of value ranges according to a threshold, wherein each of the value ranges has a quantization value. If the biometric data falls within one of the value ranges, the processing unit uses the quantization value of the value range as a quantified data for replacing the biometric data. The processing unit then performs a one-way function to convert the quantified data into an encrypted data and compares the encrypted data with the encrypted registered data.

In the present invention, a biometric data is quantified and a one-way function is performed on the quantified data. Accordingly, the advantages of biometrics and cryptography can be integrated in the present invention. In other words, in the present invention, a biometric data can be encrypted, and at the same time, the characteristic of error tolerance in the comparison of biometric data is retained. As a result, even if an unauthorized person obtains a registered biometric data from a biometric apparatus, he/she cannot decrypt the biometric data. In particular, if the comparison is carried out remotely, an unauthorized person cannot decrypt the biometric data even if he/she intercepts the encrypted biometric data. The present invention can be applied in the integration of biometrics and cryptography so as to improve the security in biometric data storage and application. According to the present invention, biometric data can be protected from being stolen or misappropriated by malice program or unauthorized persons, and moreover, biometric features can be used for achieving cryptography functions such as encryption, authentication, recognition, signature, hashing, and key replacement.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
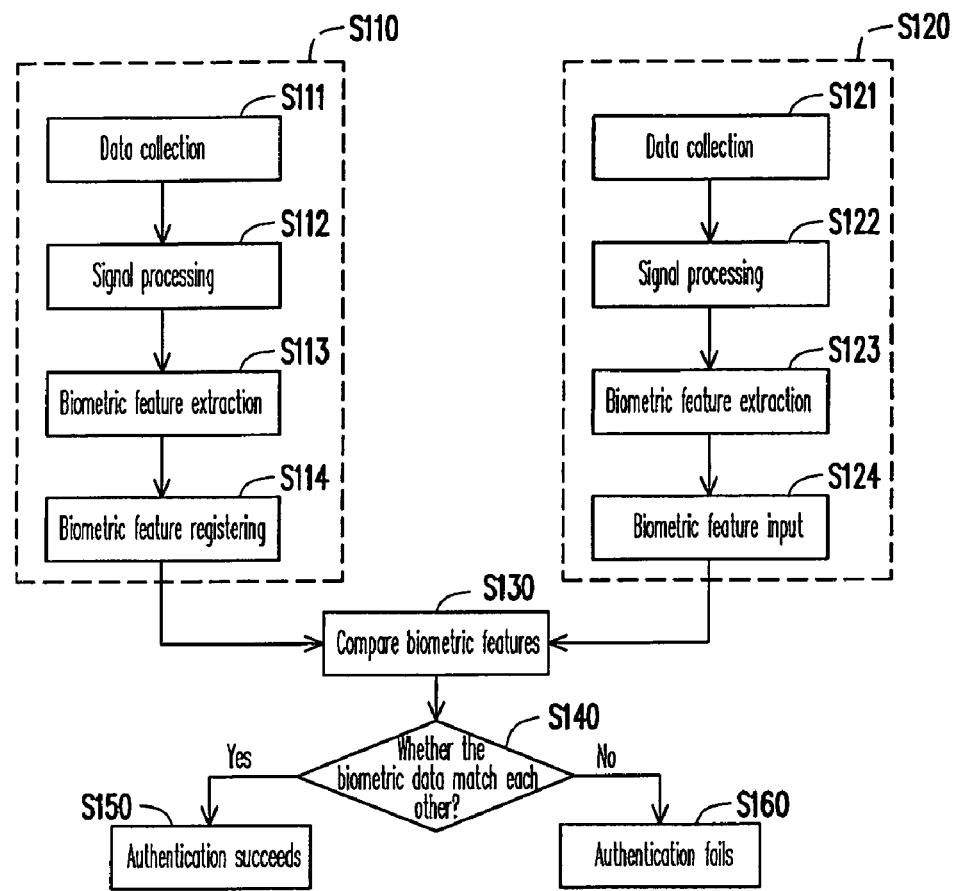
FIG. 1 is a flowchart of a conventional biometric method.

Reference will now be made in detail to the present preferred embodiments of the invention, examples of which are illustrated in the accompanying drawings. Wherever possible, the same reference numbers are used in the drawings and the description to refer to the same or like parts.

Figure 2:
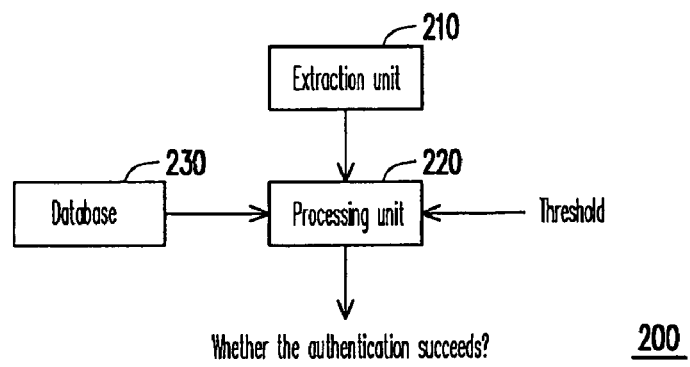
FIG. 2 illustrates an implementation example of a biometric apparatus according to the present invention.

FIG. 2 illustrates an implementation example of a biometric apparatus according to the present invention. Referring to FIG. 2, the biometric apparatus 200 includes an extraction unit 210, a processing unit 220, and a database 230. The processing unit 220 is coupled to the extraction unit 210 and the database 230. The extraction unit 210 extracts a biometric data, wherein the biometric data may be fingerprint features. In another embodiment of the present invention, the biometric data may also be iris features, palm print features, or pupil features.

The processing unit 220 defines a plurality of value ranges according to a threshold, wherein each of the value range has a quantization value. For example, if the threshold is 4, the value ranges may be defined as (1~8), (9~16), (17~24), (25~32), (33~40), . . . etc, and the quantization values of these value ranges may be 4, 12, 20, 28, 36, . . . etc. The threshold may be set externally or determined according to an internal value of the processing unit 220.

If a biometric data output by the extraction unit 210 falls within one of the value ranges, the processing unit 220 uses the quantization value of the value range as a quantified data for replacing the biometric data output by the extraction unit 210. For example, if the biometric data output by the extraction unit 210 is 30, since 30 falls within the value range (25~32), the processing unit 220 uses the quantization value 28 of the value range (25~32) as the quantified data. Here the biometric data 30 output by the extraction unit 210 is quantified/replaced into the quantified data 28.

Next, the processing unit 220 performs a one-way function to convert the quantified data into an encrypted data. The one-way function may be a hash function or other encryption function. The database 230 records at least one encrypted registered data. Accordingly, the processing unit 220 can carry out a comparison operation to determine whether the encrypted data matches any encrypted registered data in the database 230. If the encrypted data matches with a specific encrypted registered data in the database 230, the processing unit 220 outputs a result indicating that the authentication is successful; otherwise, if the encrypted data does not match with any encrypted registered data in the database 230, the processing unit 220 outputs a result indicating that the authentication failed.

An implementation example of the biometric apparatus provided by the present invention has been described above. Below, a biometric method and a biometric data encryption method thereof provided by the present invention will be described with reference to an embodiment of the present invention. Besides implementing the present invention with hardware, those having ordinary knowledge in the art may also implement the present invention and the following embodiment with a computer program and store the computer program in a computer-readable storage medium, so that the biometric method or biometric data encryption method provided by the present invention can be executed by a computer.

Figure 3:
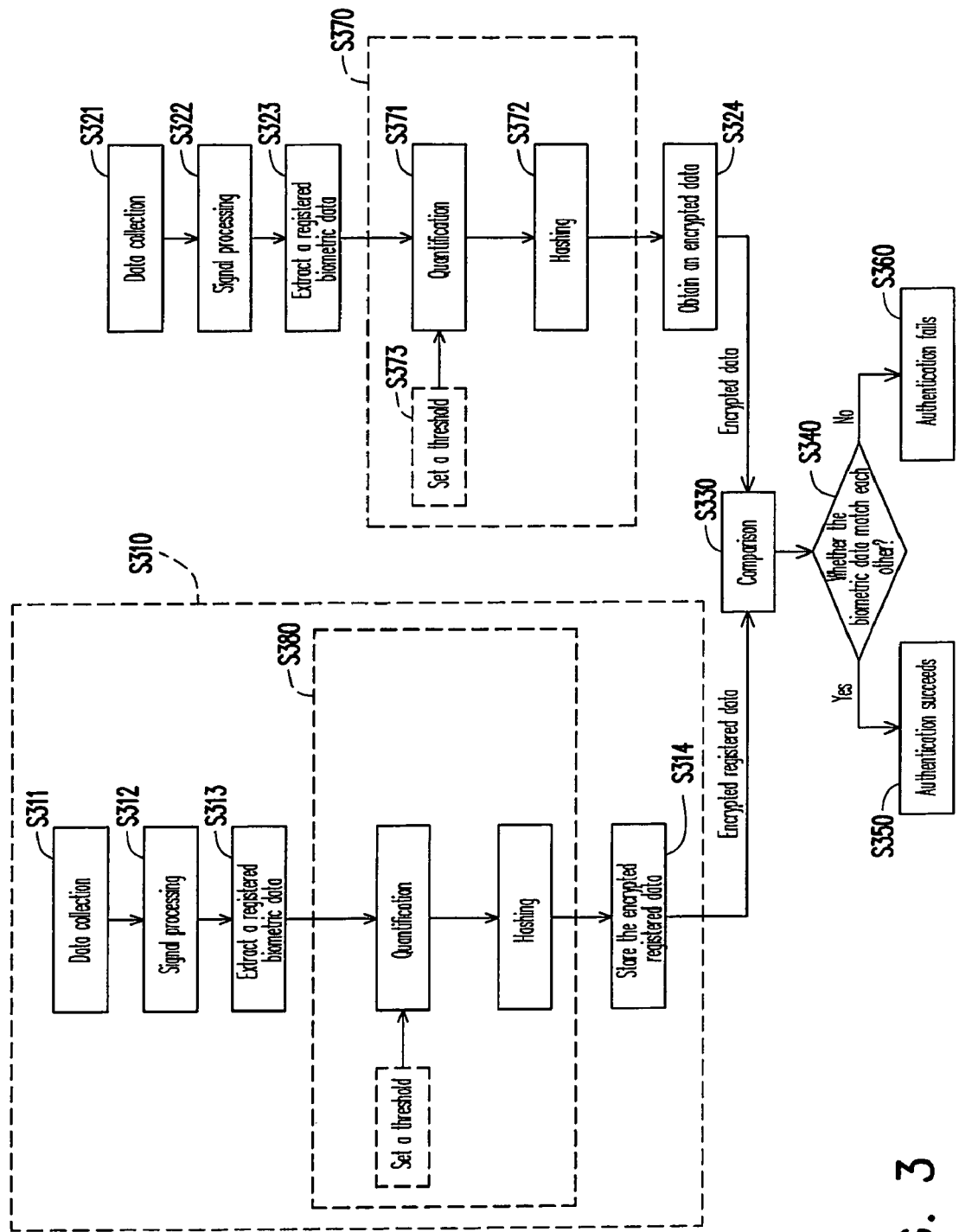
FIG. 3 is a flowchart of a biometric method according to an embodiment of the present invention.

FIG. 3 is a flowchart of a biometric method according to an embodiment of the present invention. First, an encrypted registered data is registered/provided (step S310, this step will be described below) to be used in subsequent step S330. The encrypted registered data is obtained by encrypting a registered biometric data with the biometric data encryption method in the present embodiment of the present invention. Next, a biometric apparatus or a biometric program system requests a user to input a biometric data through a sensor device and/or the driving program thereof (step S321). Step S321 is to input the biometric data (for example, a fingerprint, a human face, or an iris) to be compared. A sensor for reading biological data is usually required for reading a particular (or some) biometric data on a human body.

Next, a signal processing is carried out to the biometric data (step S322). At step S322, a signal processing is performed (for example, Gaussian smoothing, histogram equalization, normalization, binarization, opening, thinning, thin mending, and feature point extraction etc) on the biometric data.

Thereafter, a biometric feature extraction operation is carried out on the biometric data (step S323) to obtain one or multiple biometric features. A biometric data has many different types of feature points. For example, fingerprint features have end point features and branch point features, and these end point features and branch point features are usually extracted for comparison in a fingerprint recognition algorithm. Step S323 is to extract one or multiple feature points of the biometric features and use these feature points as the biometric data. Taking fingerprint recognition as an example, the biometric feature extraction operation performed in step S323 may be a structural comparison or an onion comparison. In another embodiment of the present invention, the biometric features extracted in step S323 may also be iris features, palm print features, pupil features, or other features.

Next, a biometric data encryption method S370 is carried out to encrypt the biometric data into an encrypted data. In the present embodiment, the biometric data encryption method S370 may include a step S371 and a step S372.

In step S371, the biometric data which has been processed in step S323 is quantified, and the quantified data can be used along with a cryptography technique. In step S371, a plurality of value ranges is defined according to a threshold, wherein each of the value ranges has a quantization value. If the biometric data falls within one of the value ranges, the quantization value of the value range is used as a quantified data for replacing the biometric data. The threshold can be set dynamically (step S373) or according to a constant value set in step S371.

Assuming that the tolerable error for the comparison between biometric data is a signed t (t is the threshold) and the sampling value falls within (0, L), then the biometric data is quantified into 0, p, 2p, . . . np with p as the interval, wherein p=2t, and n=$\lfloor L/p \rfloor$. If a biometric data w falls within (0, L) and (kp−p/2)≦w<(kp+p/2), the biometric data w is quantified into $w_q$=kp. For example, if the threshold t is 4, the value ranges may be (1~8), (9~16), (17~24), (25~32), (33~40), . . . etc and the quantization values of the value ranges may be respectively 4, 12, 20, 28, 36, . . . etc. If the biometric data provided in step S323 is 30, since 30 falls within the value range (25~32), the quantization value 28 of the value range (25~32) is used as the quantified data in step S371. Here, the biometric data 30 provided in step S323 is quantified/replaced into the quantified data 28. For example, if the biometric data provided in step S323 is (28, 37, 19, 62, 54) and t=5 (i.e. p=10), the biometric data is respectively quantified into (30, 40, 20, 60, 50).

After step S371, a one-way function is performed to the quantified data (step S372) to obtain an encrypted data (step S324). The one-way function may be a hash function or other encryption function. In the present embodiment, a hash function is performed to encrypt the quantified data so as to prevent the quantified data from being lost or stolen. This is because an unauthorized person cannot obtain the original biometric data even if he/she obtains the encrypted registered data stored in the database or the encrypted data from the transmission route. In another embodiment of the present invention, a hash function may also be performed on both the quantified data and a key in step S372, wherein the key may be a predetermined constant value (initial value), a random number, or other value (a real number).

Next, the encrypted data is compared with the encrypted registered data (step S330) to determine whether the two match with each other (step S340). In the present embodiment, the encrypted registered data and the encrypted data are considered to match with each other only when they are absolutely identical in order to increase the speed of the comparison operation. If the encrypted data matches with the encrypted registered data, the biometric apparatus/program outputs a result indicating that the authentication succeeds (step S350); otherwise, if the encrypted data does not match the encrypted registered data, the biometric apparatus/program outputs a result indicating that the authentication fails (step S360).

Foregoing step for registering/providing the encrypted registered data can be implemented similarly as the steps S321~S324 and S370. The step S310 may include sub-steps S311, S312, S313, S380, and S314. The biometric apparatus or biometric program system requests a user to input a biometric data through a sensor device and/or the driving program thereof (step S311). Step S311 is to input the biometric data (for example, a fingerprint, a human face, or an iris) to be compared. A sensor for reading biological data is usually required for reading a particular (or some) biometric data on a human body.

Thereafter, a signal processing is carried out on the biometric data (step S312). At step S312, a signal processing (for example, Gaussian smoothing, histogram equalization, normalization, binarization, opening, thinning, thin mending, and feature point extraction etc) is performed on the biometric data. After that, a biometric feature extraction operation is performed to the biometric data (step S313) to obtain one or multiple registered biometric features. Taking fingerprint recognition as an example, the biometric feature extraction operation performed in step S313 may be a structural comparison or an onion comparison. In another embodiment of the present invention, the biometric features extracted in step S313 may be iris features, palm print features, pupil features, or other various features.

Next, a biometric data encryption method S380 is carried out to encrypt the registered biometric data into an encrypted registered data. In the present embodiment, the implementation of the method S380 for encrypting the registered biometric data can be referred to step S370 therefore will not be described herein. After the step S380, the biometric apparatus/program stores the encrypted registered data into the database (step S314) to be used in step S330.

In the embodiment described above, all the values of a specific biometric feature are quantified into an errorless value so as to ensure that all the acceptable values within the threshold are quantified into the same value without losing data security. Besides being protected through a hash function or an encryption function, these values may be further used in a cryptography technique (for example, signature, key generation, or key swap etc) or other numerical derivation in order to prevent the biometric data stored in the storage from being lost or stolen. 100% accuracy is required in the comparison of the biometric data in order to increase the comparison speed of the biometric apparatus.

Figure 4:
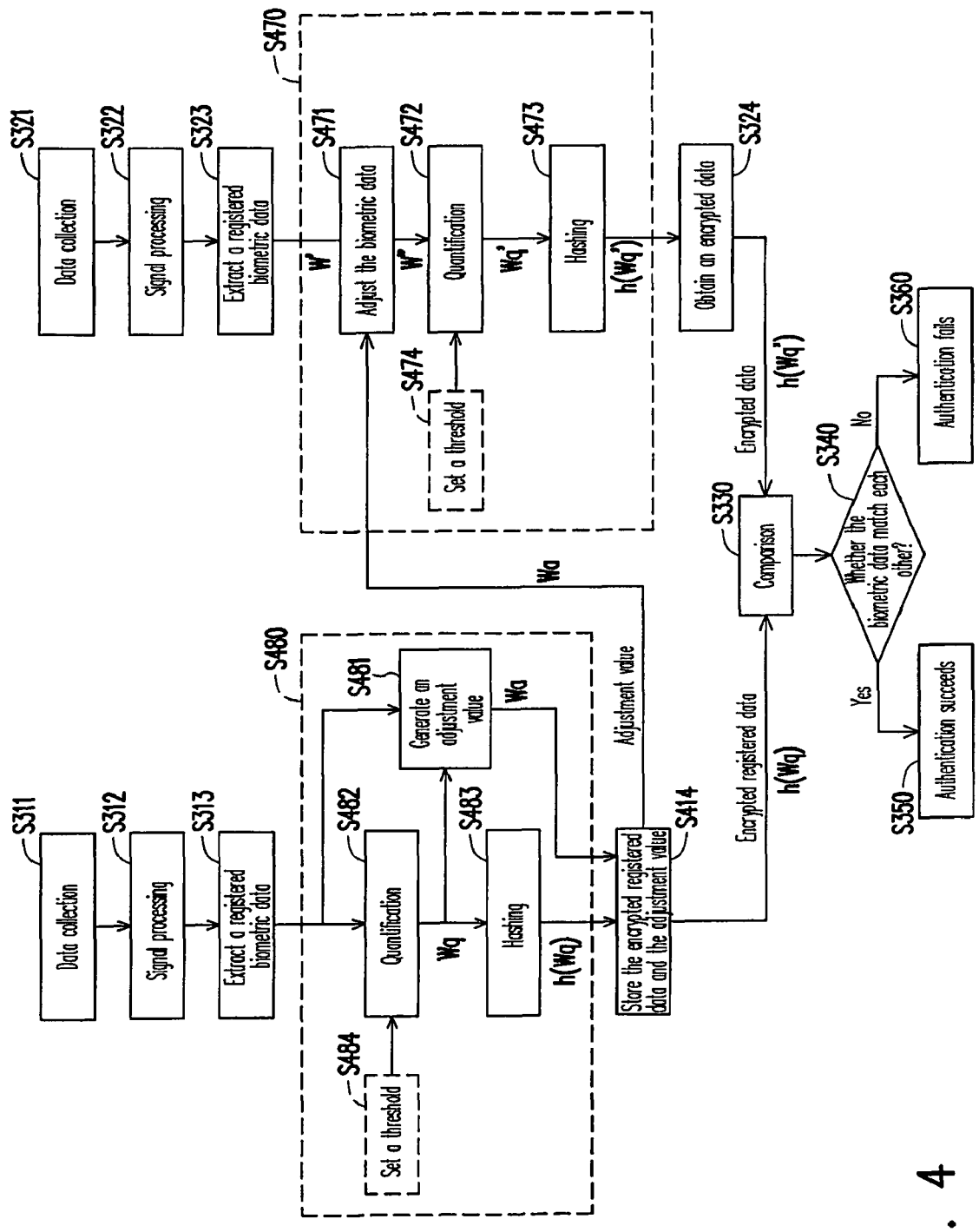
FIG. 4 is a flowchart of a biometric method according to another embodiment of the present invention.

FIG. 4 is a flowchart of a biometric method according to another embodiment of the present invention. The implementation of some steps in FIG. 4 can be referred to the description of FIG. 3 therefore will not be described herein. Referring to FIG. 4, an encrypted registered data is registered/provided through steps S311, S312, S313, S480, and S414 to be used in step S330. At step S480, a registered biometric data is encrypted by using the biometric data encryption method according to an embodiment of the present invention to obtain an encrypted registered data and an adjustment value. In the present embodiment, the encrypted registered data and the adjustment value are stored in the database of a biometric apparatus/program (step S414) to be used in steps S330 and S470.

A biometric apparatus or a biometric program system can provide a biometric function after the encrypted registered data and the adjustment value are obtained. In step S321, a user inputs a biometric data through a sensor device and/or the driving program thereof, and in step S322, a signal processing is carried out on the biometric data. Next, in step S323, a biometric feature extraction operation is performed to the biometric data to obtain one or multiple biometric features. Thereafter, a biometric data encryption method S470 is performed. In the present embodiment, in step S470, an adjustment value corresponding to the biometric data is extracted from the database of the biometric apparatus/program and is used for encrypting the biometric data obtained in step S323 into an encrypted data (step S324).

In the present embodiment, the step S470 may include sub-steps S471, S472, and S473, and the step S480 may include sub-steps S481, S482, and S483. At step S482, the registered biometric data w which has been processed in step S313 is quantified, and the quantified data (the quantified registered data $w_q$) can be used along with a cryptography technique. The step S482 may be implemented with reference to step S371 in FIG. 3 or may also be implemented through other quantification techniques. The threshold t required for the quantification operation in step S482 may be dynamically set (step S484) or determined according to a constant value set in step S482.

After step S482, a one-way function is performed to the quantified registered data $w_q$ (step S483) to obtain an encrypted data (encrypted registered data) $h(w_q)$. The one-way function may be a hash function or other encryption function. In the present embodiment, a hash function is performed to encrypt the quantified registered data. In another embodiment of the present invention, the hash function may also be performed to both the quantified registered data $w_q$ and a key to obtain the encrypted data $h(w_q)$. The key may be a predetermined constant value (initial value), a random number, or other value (a real number). In step S414, the encrypted data $h(w_q)$ is stored in a database of the biometric apparatus/program to be used in step S330.

Additionally, step S481 is performed to record the adjustment value $w_a$ during the quantification process, and the adjustment value $w_a$ can restore the recognition rate reduced by the quantification process into the original recognition rate without losing data security. In the present embodiment, the adjustment value may be calculated as: $w_a = w_q - w$. After the step S482, the difference between the quantified registered data $w_q$ and the registered biometric data w is calculated to obtain the adjustment value $w_a$ (step S481). For example, if the registered biometric data w is (28, 37, 19, 62, 54) and p=10 please refer to foregoing embodiment for the definition of p), the registered biometric data w is then quantified into (30, 40, 20, 60, 50), and the adjustment value $w_a$ is: (30−28, 40−37, 20−19, 60−62, 50−54)=(2, 3, 1, −2, −4). In step S414, the adjustment value $w_a$ is stored in the database of the biometric apparatus/program to be used in step S471.

When a user inputs a biometric data w', the adjustment value $w_a$ corresponding to the biometric data w' is obtained from the database of the biometric apparatus/program, and the biometric data w' is adjusted according to the adjustment value $w_a$, as in step S471. In the present embodiment, in step S471, w"=w'−$w_a$. Namely, after step S323, the difference between the biometric data w' and the adjustment value $w_a$ is calculated to obtain an adjusted biometric data w" (step S471).

Step S472 is to quantify the biometric data w" which has been processed in step S471, and the quantified data $w_q'$ can be used along with a cryptography technique. The implementation of step S472 may be referred to step S371 in FIG. 3 or through other quantification techniques. Here, the threshold t required by the quantification process in step S472 may be dynamically set (step S474) or determined according to a constant value set in step S472. The threshold in step S472 is the same as the threshold in step S482.

For example, when the biometric data w' is (29, 40, 18, 59, 49) and p=10, if the adjustment value $w_a$ is (2, 3, 1, −2, −4), the adjusted biometric data w" is: (29−2, 40−3, 18−1, 59+2, 49+4)=(27, 37, 19, 61, 53). The adjusted biometric data w" is converted into (30, 40, 20, 60, 50) (i.e., the quantified data $w_q'$) through the quantification process.

Through steps S471 and S472, all the acceptable values within the threshold are quantified into the same value without losing the data security. Within the tolerable error range of signed t, the probability of guessing a value with its sampling value (the biometric data w') between (0, L) is about 2t/L, while after the quantification process, the probability of guessing a quantization value with its sampling value (the biometric data w') between (0, L) is about 1/n, wherein $n = \lfloor L/p \rfloor = \lfloor L/2t \rfloor$. The probability of guessing the value before the quantification process is the same as that after the quantification process. Thereby, the quantification process does not affect data security.

After step S472, a one-way function is performed to the quantified data $w_q'$ (step S473) to obtain an encrypted data $h(w_q')$ (step S324). The one-way function may be a hash function or other encryption function. In the present embodiment, a hash function is performed to encrypt the quantified data. In another embodiment of the present invention, the hash function may also be performed to both the quantified data $w_q'$ and a key to obtain the encrypted data $h(w_q')$. In other words, the one-way function performed in step S473 is the same as the one-way function performed in step S483.

As described above, without altering the current structure of a biometric method, a sub-system can be added to an existing biometric system to integrate a cryptography technique with a biometric technique, so as to improve the security of biometric data stored in a database and biometric data comparison carried out remotely. Moreover, foregoing embodiments of the present invention can effectively prevent malice program or unauthorized person from misappropriating the biometric data. Those having ordinary knowledge in the art should be able to achieve cryptography functions (for example, encryption, authentication, recognition, signature, hashing, key replacement) by using biometric data (can be applied in banks, for replacing IC cards or stamps, and other dual authentication). According to embodiments of the present invention, biometric data can be encrypted, which not only prevents the biometric features from being stolen or misappropriated, but also achieves data privacy, integrity, and non-repudiation. Furthermore, the original recognition rate can be achieved without losing data security by setting the threshold t.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A biometric method adapted for a biometric apparatus, comprising:
   the biometric apparatus providing an hashed registered data and an adjustment value, wherein the step of providing the hashed registered data and the adjustment value comprises:
   extracting a registered biometric data;
   defining a plurality of value ranges according to a threshold, wherein each of the value ranges has a quantization value;
   using the quantization value of one of the value ranges as a quantified registered data for replacing the registered biometric data if the registered biometric data falls within the value range;

performing an one-way hash function to convert the quantified registered data into the hashed registered data;

calculating a difference between the quantified registered data and the registered biometric data to obtain the adjustment value; and storing the adjustment value and the hashed registered data;

the biometric apparatus extracting a biometric data;

the biometric apparatus adjusting the biometric data to a adjusted biometric data according to the adjustment value;

the biometric apparatus defining the value ranges according to the threshold, wherein each of the value ranges has a quantization value;

the biometric apparatus using the quantization value of one of the value ranges as a quantified data for replacing the adjusted biometric data if the adjusted biometric data falls within the value range;

the biometric apparatus performing the one-way hash function to convert the quantified data into an hashed data; and the biometric apparatus comparing the hashed registered data and the hashed data.

2. The biometric method according to claim 1 further comprising setting the threshold.

3. The biometric method according to claim 1, wherein the biometric data comprises fingerprint features, iris features, palm print features, or pupil features.

4. A biometric apparatus, comprising:

an extraction unit, for extracting a biometric data;

a database, for recording at least one hashed registered data and at least one adjustment value; and a processing unit, coupled to the extraction unit and the database, wherein the processing unit extracts a registered biometric data through the extraction unit, uses a quantization value of one of a plurality of value ranges as a quantified registered data for replacing the registered biometric data if the registered biometric data falls within the value range, performs an one-way hash function to convert the quantified registered data into the hashed registered data, calculates the difference between the quantified registered data and the registered biometric data to obtain an adjustment value, and stores the adjustment value and the hashed registered data into the database, the processing unit adjusting the biometric data according to the adjustment value; defining the value ranges according to a threshold, wherein each of the value ranges has a quantization value; wherein the quantization value of one of the value ranges is used as a quantified data for replacing the adjusted biometric data if the adjusted biometric data falls within the value range; a one-way hash function is performed to convert the quantified data into an hashed data; and the hashed data is compared with the hashed registered data.

5. The biometric apparatus according to claim 4, wherein the biometric data comprises fingerprint features, iris features, palm print features, or pupil features.

* * * * *